June 30, 1959 J. L. RAMM 2,892,750
METHOD AND APPARATUS FOR LOOSENING WET PIPE FROM A MANDREL
Filed Oct. 21, 1955 4 Sheets-Sheet 2
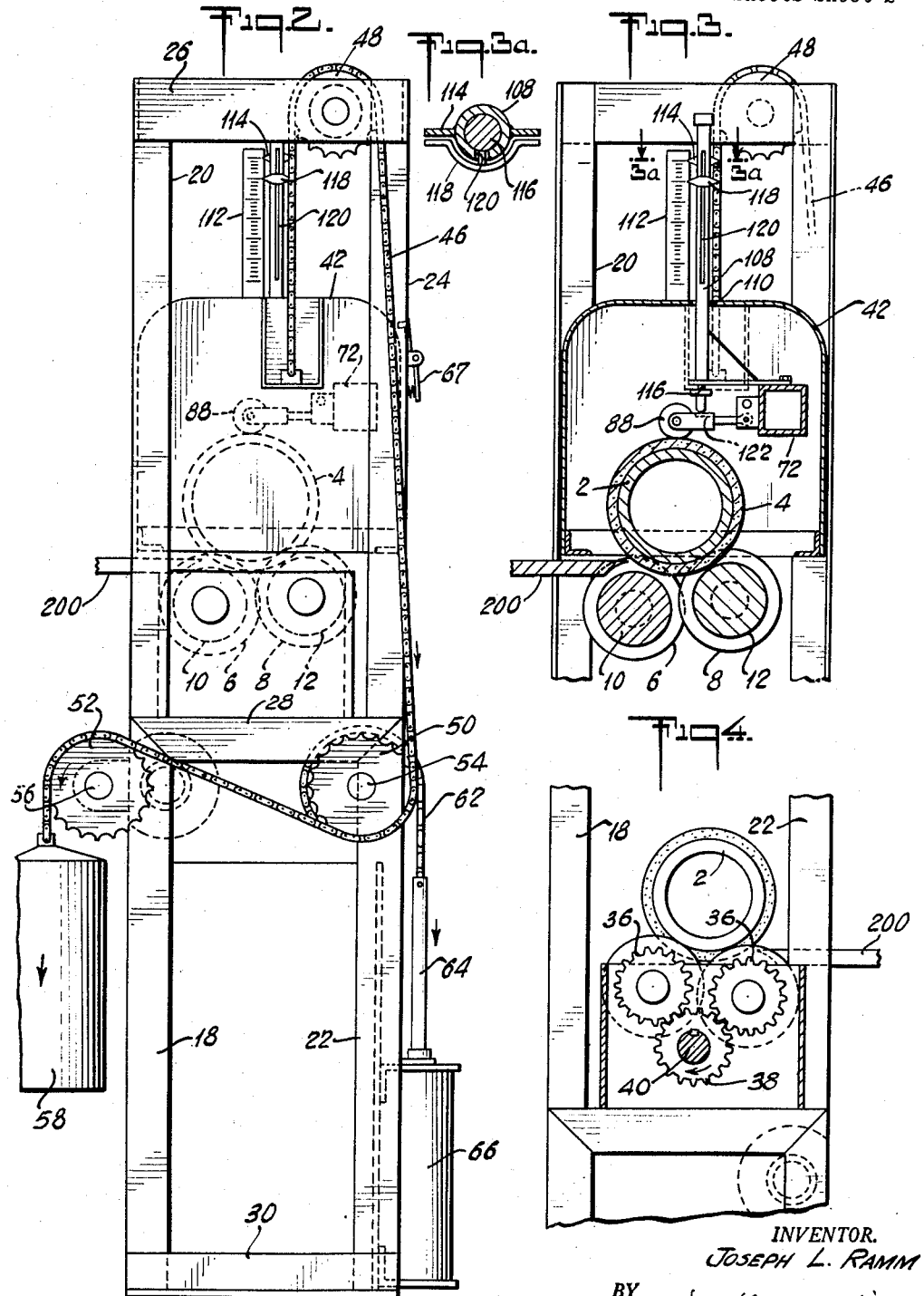
INVENTOR.
JOSEPH L. RAMM
BY Virgil C. Kline
ATTORNEY.

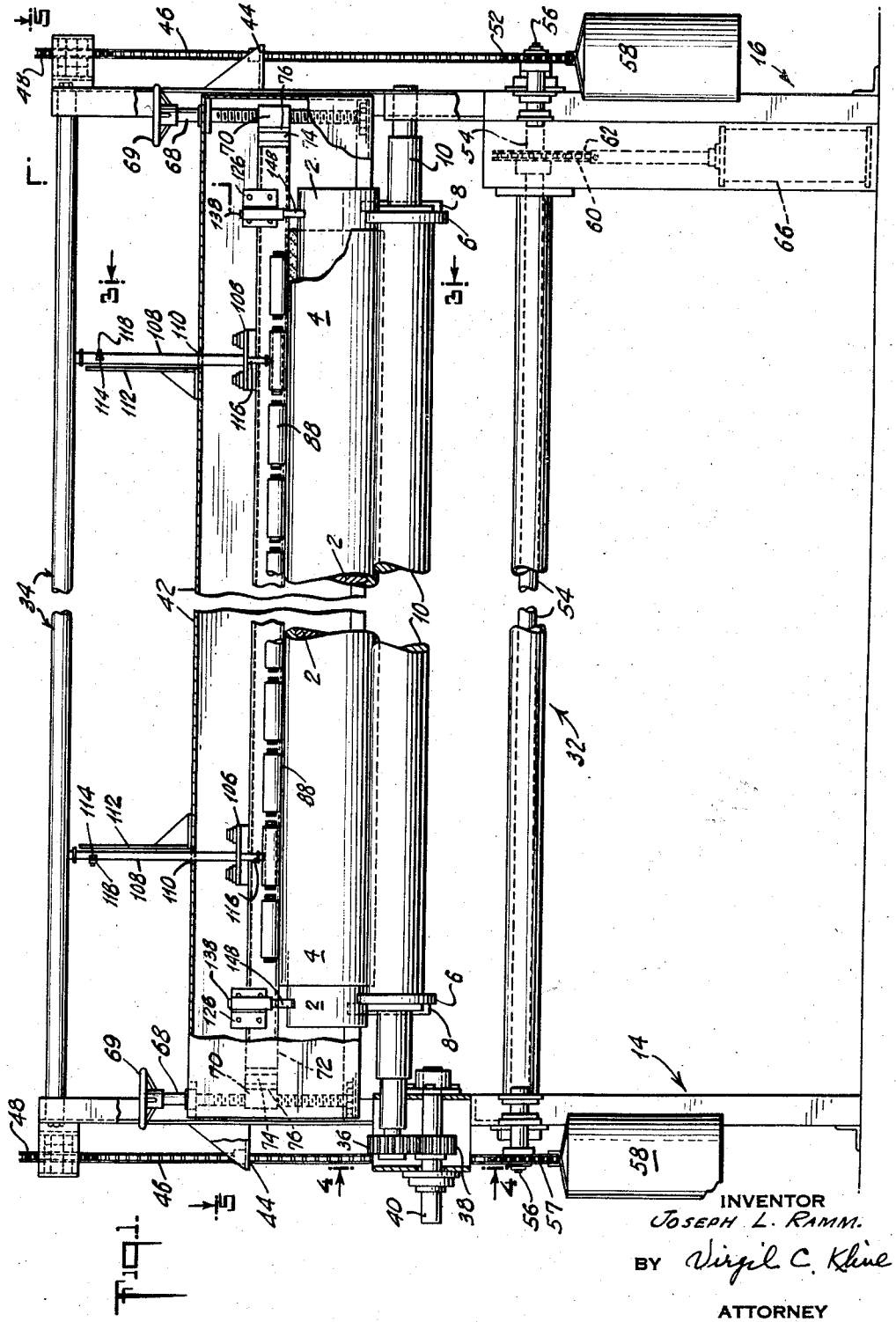

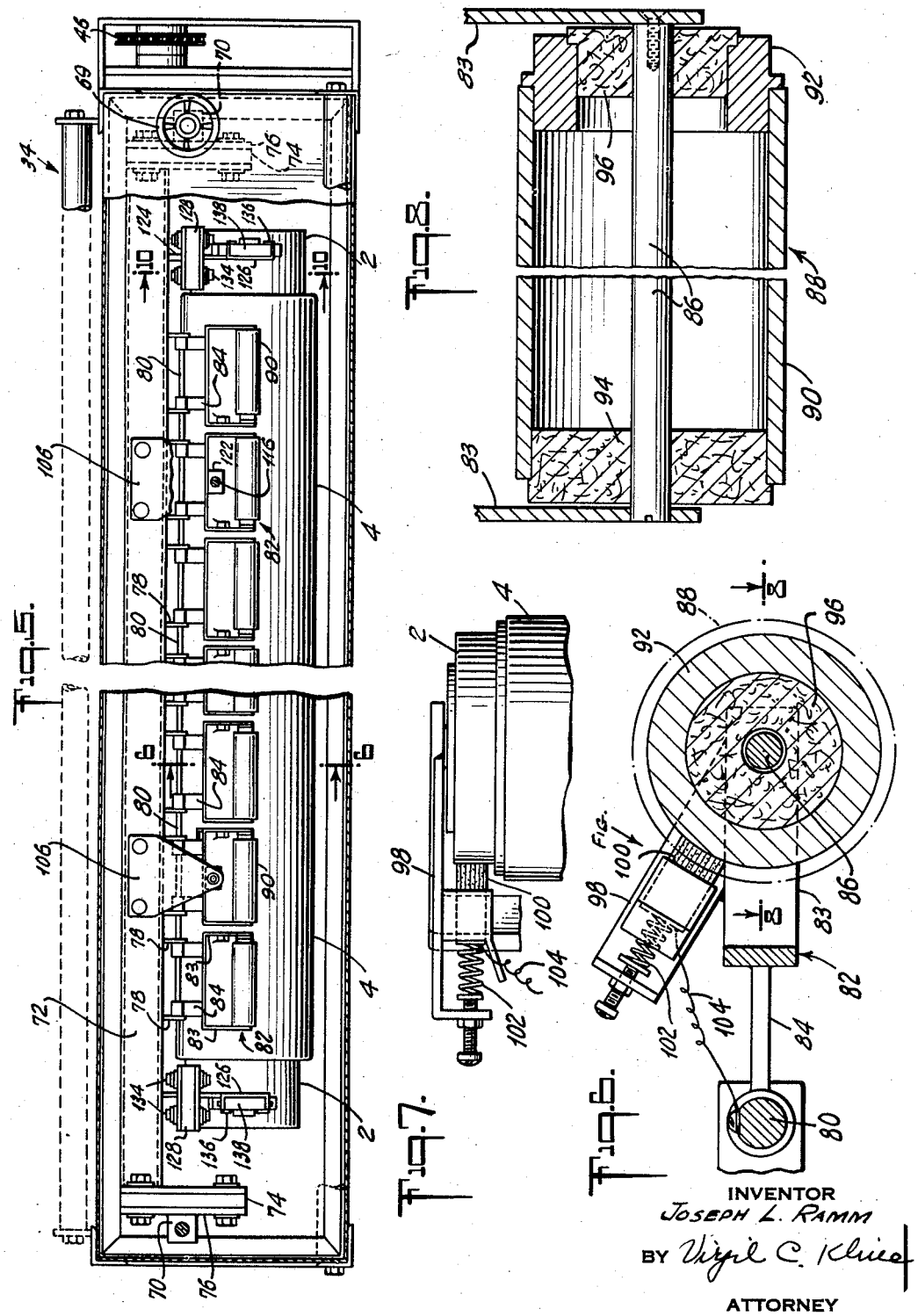

June 30, 1959    J. L. RAMM    2,892,750
METHOD AND APPARATUS FOR LOOSENING WET PIPE FROM A MANDREL
Filed Oct. 21, 1955    4 Sheets-Sheet 4
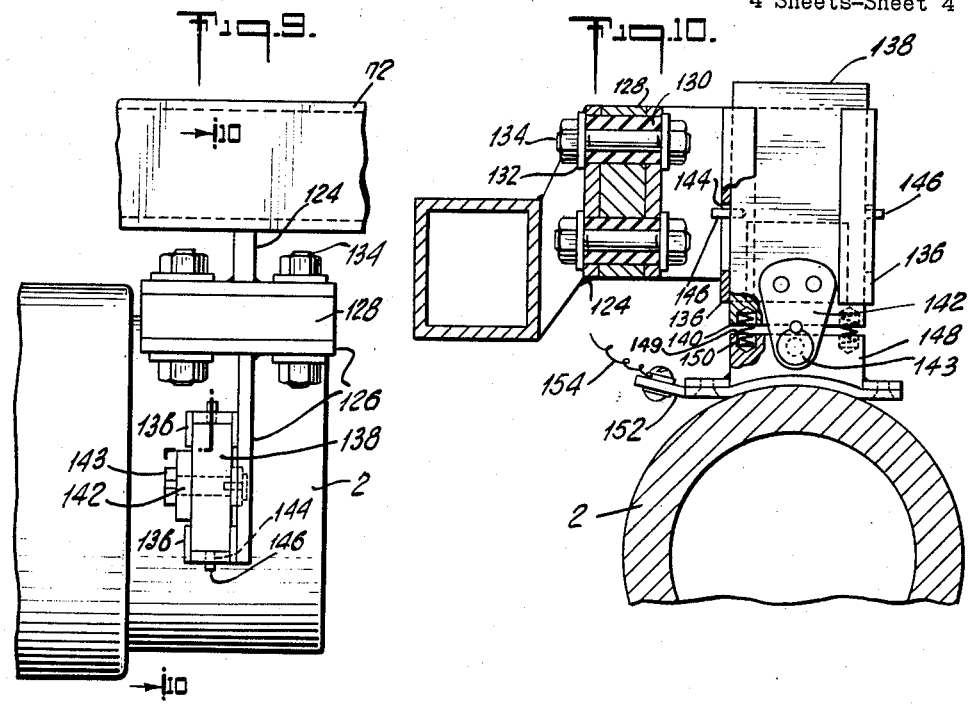
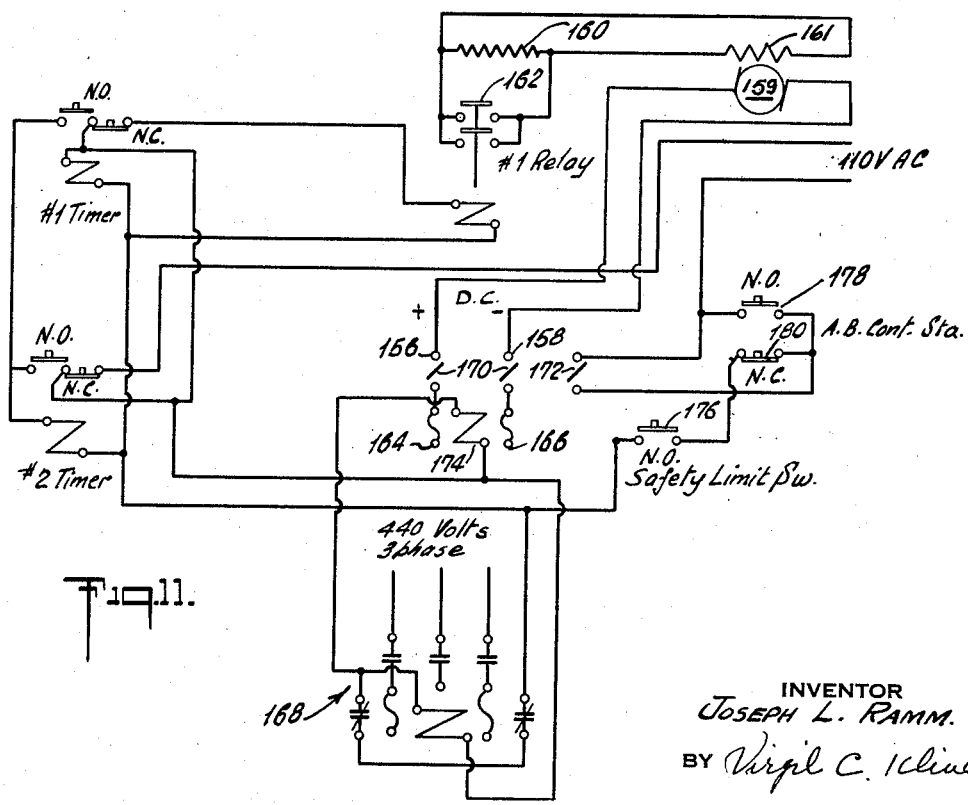
INVENTOR
JOSEPH L. RAMM.
BY Virgil C. Kline
ATTORNEY

United States Patent Office 2,892,750
Patented June 30, 1959

2,892,750

METHOD AND APPARATUS FOR LOOSENING WET PIPE FROM A MANDREL

Joseph L. Ramm, New Orleans, La., assignor to Johns-Manville Corporation, New York, N.Y., a corporation of New York Application October 21, 1955, Serial No. 542,219

7 Claims. (Cl. 162—118)

This invention relates to the manufacture of articles which are formed on a mandrel or mold from a pulp or plastic stock, and more particularly relates to a method and apparatus for loosening such articles from the members on which they are formed. A specific example of a general process to which the present invention may be applied is the manufacture of asbestos-cement pipe, and while the invention will be described with reference to such pipe, it is applicable in principle to the manufacture of other similar wet molded articles. This application is a continuation-in-part of application Serial No. 287,701, filed May 14, 1952, and now abandoned.

The conventional method of manufacturing asbestos-cement pipe involves winding a wet sheet of asbestos-cement pulp on a rotating, hollow mandrel while applying high pressure thereto. When a pipe of suitable wall thickness has been formed, the mandrel is removed from the press and the formed pipe is then removed from the mandrel for curing. Because of the high pressure applied during winding of the sheet stock, a firm bond develops between the pipe and the mandrel, and the breaking of this bond to permit removal of the pipe is a problem which has never heretofore been solved in an entirely satisfactory manner.

Many attempts have been made to devise a method of loosening the formed pipe from its mandrel without distorting the pipe or cracking or otherwise damaging its inner surface. Prior methods have ranged from coating the mandrel with oil or wax in an attempt to prevent the forming of any bond between the pipe and the mandrel, to the expedient of blowing air between the formed pipe and mandrel while subjecting the pipe to a calendering action. Apparently, attempts were also made to loosen pipe by calendering alone. These prior methods resulted in distortion and/or incomplete loosening of the pipe from the mandrel and, hence, were never satisfactory. A method similar in some respects to the method of the present invention is suggested in U.S. patent to Rembert #2,430,411 which relates in general to loosening a pipe from a mandrel by "development of a thin film of gas (or vapor)" between the pipe and mandrel "so as to effect a uniform slight expansion" of the pipe away from the mandrel. According to Rembert, development of such a film may be accomplished by heating the mandrel to cause flash-formation of steam at the interface between the pipe and mandrel or "by electrolysis; namely by impressing electric current across the pipe wall between the mandrel as one electrode and a metal screen as the other electrode, while rolling the loaded mandrel over the screen." The method, involving flash-formation of steam by heating of the mandrel, resulted, of course, in expansion of the mandrel and some consequent undesirable expansion of the pipe, although the amount of distortion resulting was not as great as with other methods known at that time. It has been learned that rolling the pipe-loaded mandrel over a screen, as suggested by Rembert, results in excessive mechanical action on the pipe without satisfactory loosening.

A primary object of the present invention is to accomplish, in a short period of time, the loosening of a wet cementitious pipe from the madrel on which it was formed without significantly expanding or distorting the pipe or raising the temperature of either the pipe or the mandrel and without subjecting the pipe to excessive mechanical action. In general the above object is attained in the present invention by grounding the mandrel and engaging the outer surface of the pipe in distinct areas along the length thereof with separately movable electrical contacts, all connected to the positive terminal of a direct current source of sufficient voltage to cause the flow of a relatively high amperage direct electrical current from the contacts through all portions of the pipe to the mandrel (it being assumed that direction of current flow is from positive to negative). The flow of such a current through the pipe causes loosening of the pipe from the mandrel and, while it is not definitely known why loosening occurs, it is believed that direct current flowing in the direction indicated is essential for effective electrical loosening. The indicated arrangement of electrical contacts permits the attainment of the high amperage current which is essential to accomplish loosening in a relatively short period of time, so that the loosening step does not become a "bottle neck" in the overall method of forming pipe.

The invention will be more fully understood and further objects and advantages thereof will become more apparent when reference is made to the following detailed description of a preferred embodiment of the invention and to the accompanying drawings in which:

Fig. 1 is a front view, partly in section of a preferred form of the present invention;

Fig. 2 is an end view of the apparatus as seen from the right in Fig. 1;

Fig. 3 is a sectional view taken on the line 3—3 of Fig. 1;

Fig. 3a is a sectional view taken on line 3a—3a of Fig. 3;

Fig. 4 is a sectional view taken on line 4—4 of Fig. 1;

Fig. 5 is a sectional view taken on line 5—5 of Fig. 1;

Fig. 6 is a sectional view taken on line 6—6 of Fig. 5;

Fig. 7 is a partial elevational view showing a detail of the structure of Fig. 6;

Fig. 8 is a sectional view taken on line 8—8 of Fig. 6;

Fig. 9 is a top view of the mandrel brush and supporting bracket;

Fig. 10 is a sectional view taken on line 10—10 of Fig. 9; and,

Fig. 11 is a diagrammatic illustration of a control circuit forming a part of the present invention.

In the drawings there is shown a hollow steel mandrel 2, to which is bonded a wet asbestos-cement pipe 4, the mandrel and pipe being supported as a unit by aligned pairs of collars 6 and 8 engaging the mandrel at the end portions not covered by the pipe. Each pair of collars 6 and 8 is attached to a steel roller 10 or 12, the rollers being located at opposite sides of a vertical plane passing through the axis of the mandrel. If desired, the unit formed by the article and mandrel may be supported directly by the rollers 10 and 12 by eliminating the collars 6 and 8 and thus permitting the outer surface of the pipe to contact the rollers.

Rollers 10 and 12 are supported at their opposite ends in any suitable bearings mounted in frame members 14 and 16, each of which consists of front and rear angle members 18, 20, 22, 24, (Fig. 2) connected by horizontal straps 26, 28 and 30. The two frame ends are connected by a suitable number of longitudinal members such as pipes 32 and 34.

To one end of each of the rollers 10 and 12 there is attached a gear 36 driven by another gear 38. Gear 38 is attached to shaft 40, adapted to be driven by a motor (not shown) in the direction of the arrow. The arrangement is such that rollers 10 and 12 and hence collars 6 and 8 rotate in the same direction and consequently are adapted to rotate the unit formed by the pipe and mandrel.

Mounted for vertical sliding movement on the vertical angle members of the frame ends is a hood 42 having bracket members 44 extending from opposite ends thereof. To each bracket 44 there is attached one end of a chain 46 which passes over a sprocket 48 rotatably mounted in any desired manner to the upper frame strap 26 (Fig. 2). Each chain then passes beneath a sprocket 50 and over a sprocket 52, fixed to shafts 54 and 56 respectively, mounted on the frame member in any suitable manner. To the lower end of each chain there is attached a weight 58 which is less than one half the weight of the hood 42 and therefore only partial counterbalances the hood. Attached to shaft 54 inwardly of sprocket 50 is another sprocket 60 having one end of a chain 62 attached thereto, the other end of chain 62 being attached to the piston rod 64 of diagrammatically illustrated hydraulic unit 66. When piston rod 64 is moved downwardly, the hood 42 will be raised to the top of the frame, and when the piston rod is permitted to move upwardly, the hood, because it is heavier than weights 58, will slide downwardly to its lower limit of movement. The movement of the hood may be limited by any desired mechanical means or by limiting the movement of piston rod 64. For the purpose of holding the hood in a raised position, when hydraulic unit 66 is inoperative, a latch 67 may be provided.

Rotatably mounted adjacent the ends of hood 42 are a pair of externally threaded members 68 provided with handwheels 69. Threadedly engaged with each member 68 is a pair of brackets 70, which are connected to a bar 72 extending longitudinally of the hood. The brackets 70 are electrically isolated from the bar 72 by means of insulating spacers 74 and insulating sleeves (not shown) which pass through brackets 70, spacers 74 and bar brackets 76. This connection is similar to the construction illustrated in Fig. 10 and later to be described. By rotating members 68, the vertical position of bar 72 may be adjusted as desired. Secured to the bar 72 are a plurality of pairs of projections 78 having aligned openings therethrough for receiving and supporting a rod 80, a plurality of U-shaped brackets 82 being attached to the bar 80 by means of arms 84. Fixedly mounted between the side arms 83 of each bracket 82 is a shaft 86 (see Fig. 8) for supporting contact rollers 88. Each roller 88 consists of a cylindrical member 90 of conducting material, a tubular member or collector ring 92 made of conducting material and partially inserted within the cylindrical member, and a pair of insulating members 94 and 96 inserted within the cylindrical member 90 and the tubular member 92, respectively. Insulating members 94 and 96 are rotatably mounted on shaft 86 and electrically isolate contact roller 88 from bracket members 82. Mounted on one of the side arms 83 of each bracket member 82 is a brush holder 98 in which is mounted a carbon brush 100, resiliently urged into contact with collector ring 92 by means of spring 102 and connected to the rod 80 by means of a lead 104.

Contact rollers 88 are preferably about 6 inches in length and are so connected to the bar 80 as to be individually movable around the bar through a small arc. This movability can be accomplished by any mechanical expedient for limiting pivotal movement or by relying upon a natural resiliency in arms 84. With such an arrangement an irregularity in the contour of the pipe will not ordinarily cause more than one roller to move out of substantial contact with the pipe and this only momentarily. Thus, the construction described provides an arrangement whereby satisfactory contact is always obtained between the contact rollers and the pipe.

Mounted on, but electrically isolated from, the bar 72 is a pair of brackets 106, to each of which is secured a tubular member 108, passing through an aperture 110 in the upper portion of hood 42. On the upper side of hood 42, adjacent each aperture 110, is fixed a graduated member 112 positioned for cooperation with the pointer element 114 of tubular member 108 to indicate the exact position of bar 72. Slidably mounted within each tubular member 108 is a rod 116 having a pointer 118 secured to the upper end thereof, the pointer extending through a slot 120 in tubular member 108. The lower end of each rod 116 is made of an insulating material and engages a projection 122 fixed to one of the brackets 82, and thus the pointer 118 in conjunction with the graduated member 112 indicates the position within the hood of contact rollers 88.

In Figs. 9 and 10 there is illustrated the means for mounting the brushes which contact the end portions of the mandrel 2. Attached to bar 72 is a T-shaped bracket 124 to which is connected a second T-shaped bracket 126. Interposed between the T-shaped brackets is a spacer member 128 made of insulating material, the brackets and spacer member having groups of aligned openings therein. Passing through each group of aligned openings is a sleeve 130 of insulating material and at each end of each sleeve an insulating washer 132 is positioned. Fastening means 134 extend through the washers and sleeve, and secure the brackets and spacer member together. It will thus be seen that bracket member 126 is electrically isolated from bar 72. As previously indicated bar 72 is electrically isolated from threaded members 68 by an arrangement substantially the same as the one just described.

Attached to bracket 126 is a pair of oppositely disposed channel members 136. Slidably mounted within the channel members is a block 138 having a pair of recesses 140 in the lower edge thereof, and an ear 142 attached to one side face thereof and extending below the lower edge. The web of each channel 136 is provided with a slot 144 through which extends a pin 146 secured to block 138. The lower block 148 is secured to the upper block 138 by means of a pin 143, extending through aligned holes in block 148 and ear 142. Block 148 has a pair of recesses 149 in its upper surface aligned with the recesses 140 in the lower surface of block 138 and positioned within the aligned pairs of recesses are a pair of springs 150, which in conjunction with pin 143, provide a yielding pivotal mounting for block 148. Attached to the lower end of block 148 is a partially arcuate copper brush bar 152 having a lead 154 secured thereto.

Fig. 11 is a schematic diagram of a circuit suitable for use with the apparatus described above. Terminals 156 and 158 are connected, respectively, to the positive and negative terminals of a D.C. generator 159 of a rated value, for example, of 60 kilowatts and 350 volts. Resistor 160 is so arranged that it can be placed in the shunt field 161 of this generator, or shorted by means of contacts 162 of #1 Relay. Terminals 164 and 166 are connected to the contact roller support bar 80 and the mandrel brush leads 154, respectively. The arrangement generally designated 168 is a control switch for an electric motor, for example a 440 volt 3 phase motor, which drives shaft 40, and elements 170 and 172 are contacts controlled by relay 174. Switch 176, arranged to be closed on lowering hood 42, is provided for the purpose of insuring that the apparatus is not energized until all current carrying portions are covered, and the button actuated switches 178 and 180 are for the purpose of closing and opening the 110 volt A.C. circuit, which energizes the relay and timer coils.

In operation a mandrel and wet pipe unit is taken from the forming machine and rolled into the loosening apparatus from a table 200 illustrated in Fig. 2. Members 68 are rotated until pointers 114 are opposite the nominal pipe diameter as indicated on graduated member 112. The hood is lowered and if contact rollers 88 properly engage the pipe, pointer 118 should be aligned with pointer 114. Switch 176 having been closed by lowering the hood, switch 178 is then manually closed to energize the control circuit.

With switches 176 and 178 closed, the relay coil of switch 168 closes the contacts which energize the drive motor for rollers 10 and 12, thus starting rotation of the pipe and mandrel unit. At the same time, coil 174, #1 Timer and #1 Relay are also energized. Energization of coil 174 closes contacts 170 and thereby electrically connects contact rollers 88 and the mandrel to the D.C. generator. Coil 174 also closes contact 172 through which the control circuit is maintained when switch 178 is permitted to return to its normal opened position. The is permitted to return to its normally opened position. The coil of #1 Relay closes contacts 162 which short out resistor 160 and thus remove it from the shunt field 161 of the D.C. generator 159 to impress the output voltage of the generator across the pipe and cause current to flow therethrough. Simultaneously with the shorting out of resistor 160 the timing cycle of #1 Timer is started, this timer controlling the duration of current flow through the pipe.

With contacts 88 engaging the rotating pipe and current of sufficient amperage flowing through the pipe, a loosening action begins to take place. The main purpose of the arrangement shown is to enable a current of about 100 amperes to be passed through all portions of the pipe, a current of this amperage being sufficient to effect complete loosening of a six inch asbestos-cement pipe in about 30 seconds. Thus for such pipe #1 Timer should normally be set to permit current flow for about 35 seconds. The loosening action is thought to result from migration of water or gases, or a combination of both, to the interface between the pipe and the mandrel. Regardless of the causes of loosening, it has been established that through the use of this process the pipe is separated from the mandrel without distortion of the pipe or damage to its inner surface, resulting in pipes about 26% stronger than those loosened by previous methods. The contact rollers 88 exert very little pressure on the pipe wall and do not gouge or distort the pipe or result in any substantial calendering action on the pipe. Thus, where collars 6 and 8 engage the mandrel, the disclosed process does not involve any calendering, and where rolls 10 and 12 engage the pipe, as is desirable with some heavy-wall pipe, only the normal calendering action, as distinguished from calendering under pressure, is involved. Because the rollers 88 are separate from and movable independently of the means for supporting and rotating the mandrel, and engage distinct areas along the length of the pipe, it is possible to maintain good electrical contact and current flow throughout the pipe length without excessive weight concentrated on relatively small areas of the pipe. A voltage drop across the pipe wall of about 300 volts will usually be sufficient to attain the desired current flow.

At the end of the timing cycle of #1 Timer the normally open contact is closed and the normally closed contact is opened, thereby energizing #2 Timer and de-energizing #1 Relay. On de-energization of #1 Relay, contacts 162 open and place resistor 160 in the shunt field 161 of the D.C generator 159 to reduce the voltage to a relatively low level, i.e., to a level insufficient to produce detrimental arcing when the circuit is broken. The #2 Timer is set to trip in about 5 seconds, thus allowing a sufficient time for the voltage of the D.C. generator to drop before its normally closed contact is opened. When the normally closed contact of #2 Timer opens, the control circuit is broken, thus de-energizing all relays and breaking the circuits to the drive motor and the contact rollers 88. At this point the hood can be raised and the pipe and mandrel removed from the machine onto a table (not shown) similar to the table 200. It will be noted that since the voltage is reduced prior to breaking the circuit and prior to lifting the contact rollers from engagement with the pipe, there is no damage to the circuit or pipe because of arcing. It has been found that for most sizes of pipe the total time involved in placing pipe in and removing it from the loosener is about 15 to 20 seconds, which means that for the six inch pipe referred to about the total cycle of operation would be about 55 to 60 seconds. With higher voltages and currents the loosening step may be shortened and the total cycle shortened correspondingly.

It has been found that when the pipe and mandrel are removed from the apparatus after the cycle of operation described above, the pipe is completely loosened from the mandrel and can be easily removed for placement in a curing device. As previously indicated, the manner of loosening the pipe is such that there is little or no effect on the structure of the pipe, and as a result pipes loosened by use of the present invention are of substantially higher quality than pipes loosened by prior methods.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. Apparatus for loosening a wet cementitious pipe from a mandrel to which it is bonded comprising support means for supporting the pipe and mandrel, a plurality of individually movable electrical contacts arranged to engage areas of the pipe along the length thereof when the pipe and mandrel are supported by said support means, a direct current electrical source, means electrically connecting said contacts to the positive terminal of said source, and means electrically connecting said mandrel to the negative terminal of said source.

2. Apparatus for loosening a wet cementitious pipe from a mandrel to which it is bonded comprising support means for supporting and rotating the pipe and mandrel, a plurality of electrically conductive rollers associated with but separate from said support means, said rollers being arranged to engage areas along the length of the pipe when the pipe is supported on and rotated by said support means and to be individually movable relative to the pipe while in engagement therewith, a direct current electrical source, means electrically connecting said contacts to the positive terminal of said source, and means electrically connecting said mandrel to the negative terminal of said source.

3. The apparatus of claim 2 wherein said support means engages the mandrel only.

4. The apparatus of claim 2 wherein said support means engages the pipe only.

5. Apparatus for loosening a wet pipe from an electrically conductive mandrel to which it is bonded comprising means for supporting and rotating said pipe and mandrel as a unit, a plurality of electrically conductive rollers mounted on a common support, means for moving said support toward and away from said pipe to move said rollers into and out of contact with said pipe, electrical contact means for engaging said mandrel, means connecting said rollers to one terminal of an electrical source, means for connecting said contact means to the other terminal of said source, means for raising the voltage of said source when said rollers contact said pipe, and means for reducing the voltage of said source before said rollers are moved out of contact with said pipe.

6. Apparatus for loosening a wet pipe from an electrically conductive mandrel to which it is bonded comprising means in contact with said mandrel for supporting and rotating said pipe and mandrel as a unit, a hood, a bar adjustably mounted within said hood, a plurality of electrically conductive rollers connected to said bar and arranged to engage said pipe, means for moving said hood toward and away from said pipe to move said rollers into and out of engagement with said pipe, electrical contact means for engaging said mandrel, means connecting said rollers to one terminal of an electrical source, means for connecting said contact means to the other terminal of said source, means for raising the voltage of said source when said rollers engage said pipe, and means for reducing said voltage before said rollers are removed from engagement with said pipe.

7. A method of loosening a wet cementitious pipe from a mandrel to which it is bonded comprising supporting the pipe and mandrel, engaging the pipe at distinct areas along the length thereof with electrical contact means, establishing an electrical connection between the electrical contact means and the positive terminal of a direct current electrical source and also between the mandrel and the negative terminal of the source, and loosening the pipe from the mandrel by causing a direct current to flow through the electrical contact means, the pipe and the mandrel.

References Cited in the file of this patent

UNITED STATES PATENTS

| | | |
|---|---|---|
| 982,170 | Burton | Jan. 17, 1911 |
| 1,113,208 | Ehret | Oct. 13, 1914 |
| 1,234,701 | Parker | July 24, 1917 |
| 1,864,592 | Griffin et al. | June 28, 1932 |
| 1,866,538 | Andrus | July 12, 1932 |
| 1,985,073 | Mazza | Dec. 11, 1934 |
| 2,430,411 | Rembert | Nov. 4, 1947 |
| 2,525,355 | Hoyler | Oct. 10, 1950 |
| 2,551,631 | Pearce | May 8, 1951 |

FOREIGN PATENTS

| | | |
|---|---|---|
| 553,946 | Great Britain | June 11, 1943 |